Figure 1:
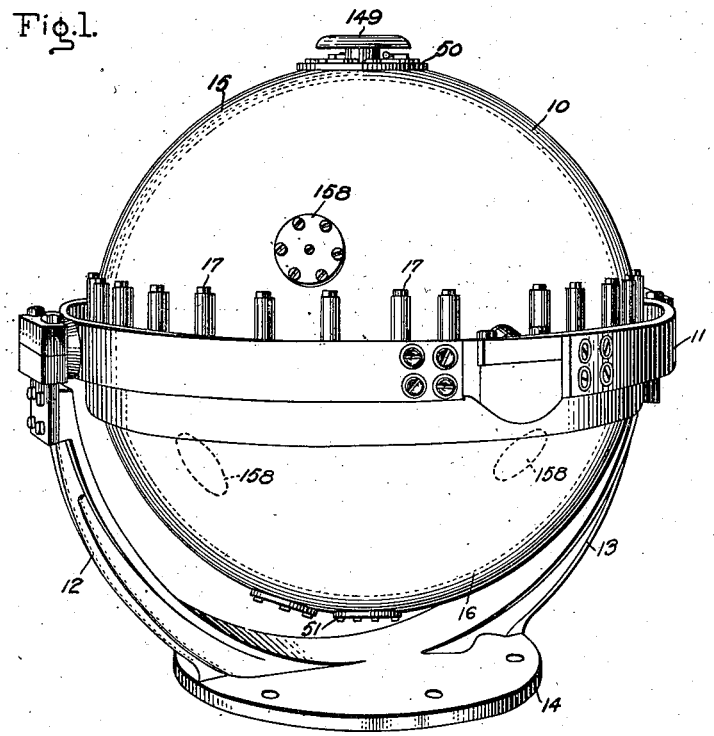

July 15, 1924.

C. G. ABBOT 1,501,886

GYROSCOPIC NAVIGATION INSTRUMENT

Filed Oct. 27, 1921    5 Sheets-Sheet 1

Inventor:
Charles G. Abbot,
by His Attorney.

July 15, 1924.

C. G. ABBOT 1,501,886

GYROSCOPIC NAVIGATION INSTRUMENT

Filed Oct. 27, 1921     5 Sheets-Sheet 2

Inventor:
Charles G. Abbot,
by Albert G. Davis
His Attorney.

July 15, 1924.

C. G. ABBOT

GYROSCOPIC NAVIGATION INSTRUMENT

Filed Oct. 27, 1921    5 Sheets-Sheet 3

Inventor:
Charles G. Abbot,
by His Attorney.

July 15, 1924.
C. G. ABBOT
1,501,886
GYROSCOPIC NAVIGATION INSTRUMENT
Filed Oct. 27, 1921    5 Sheets-Sheet 4
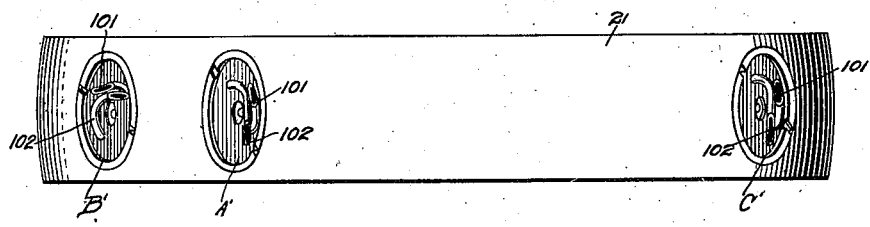
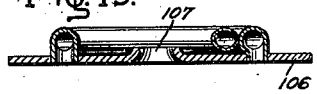
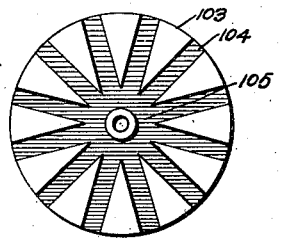
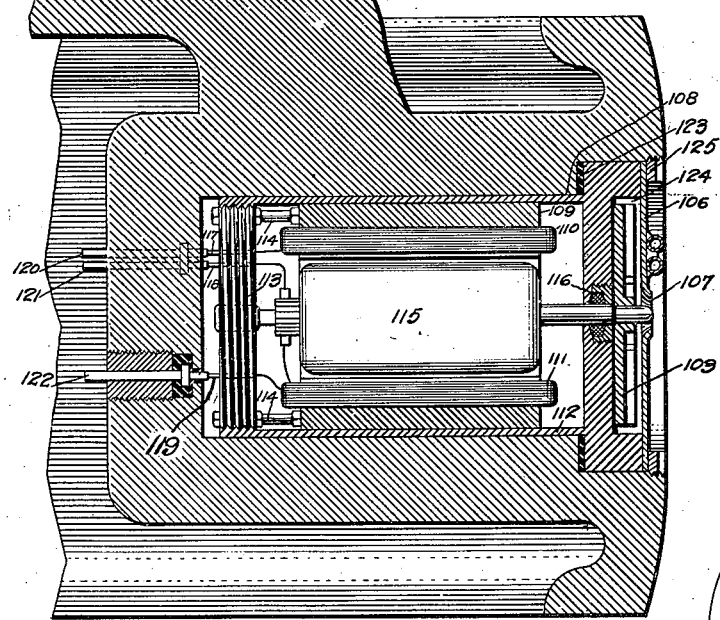
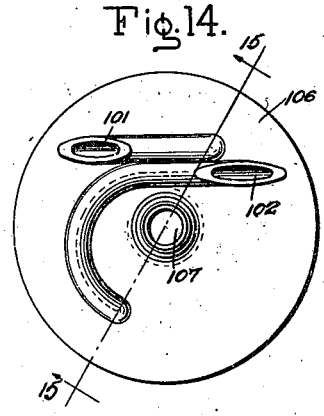
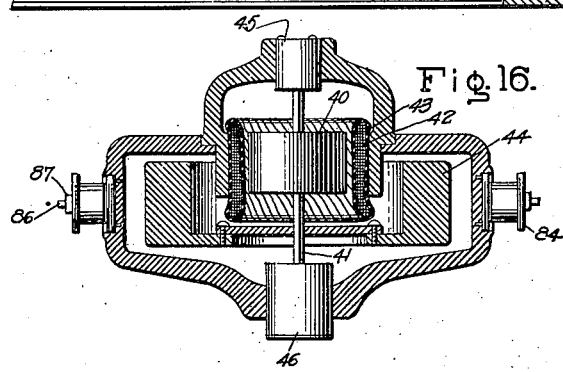
Inventor:
Charles G. Abbot,
by *Albert G. Davis*
His Attorney.

July 15, 1924.
C. G. ABBOT
GYROSCOPIC NAVIGATION INSTRUMENT
Filed Oct. 27, 1921
1,501,886
5 Sheets-Sheet 5
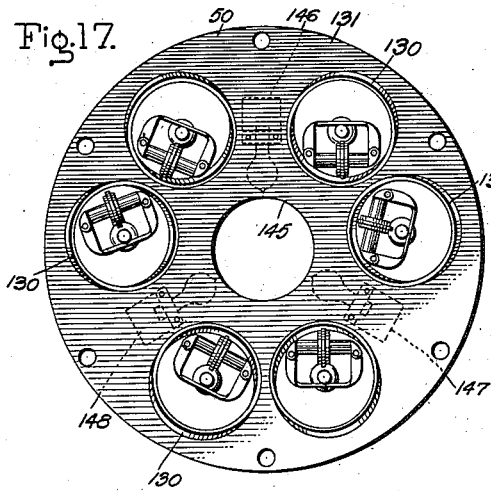
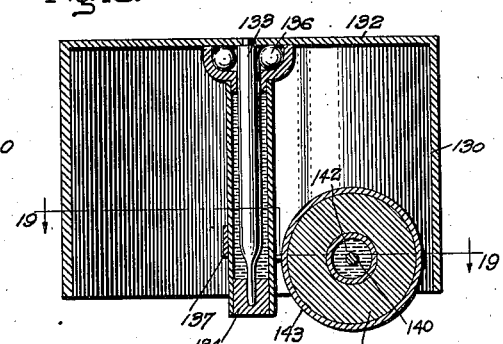
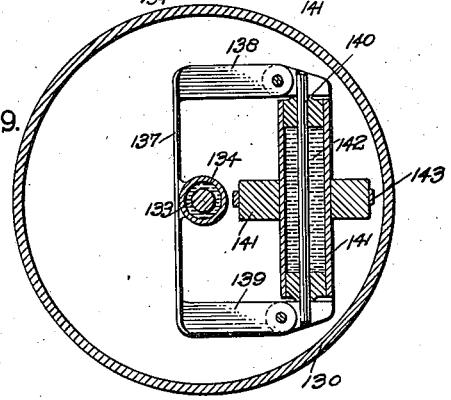
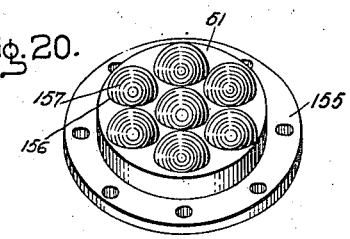
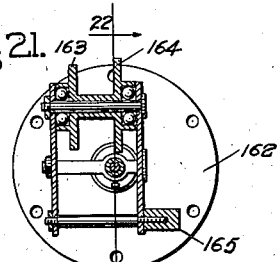
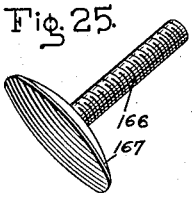
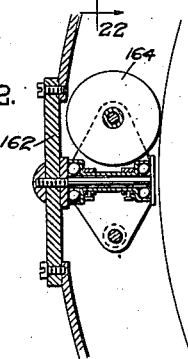
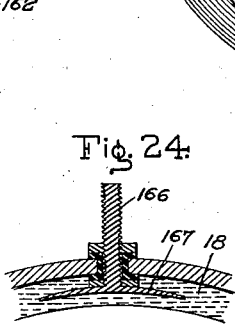
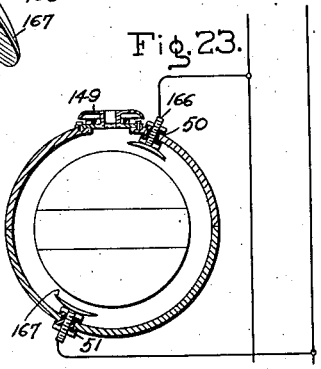
Inventor:
Charles G. Abbot,
by His Attorney.

Patented July 15, 1924.

1,501,886

UNITED STATES PATENT OFFICE.

CHARLES G. ABBOT, OF WASHINGTON, DISTRICT OF COLUMBIA, ASSIGNOR TO GENERAL ELECTRIC COMPANY, A CORPORATION OF NEW YORK.

GYROSCOPIC NAVIGATION INSTRUMENT.

Application filed October 27, 1921. Serial No. 510,803.

*To all whom it may concern:*

Be it known that I, CHARLES G. ABBOT, citizen of the United States, residing at Washington, in the District of Columbia, have invented certain new and useful Improvements in Gyroscopic Navigation Instruments, of which the following is a specification.

My invention relates to gyroscopic navigation instruments and has for its object the stabilization of an element against any force tending to change its angular position in space.

More specifically my invention relates to means for automatically maintaining a definite axis of an element, such as a sphere, parallel with the earth's axis and at the same time maintaining the element in a fixed angular position in space so that it is independent of the earth's rotation. When an element is stabilized in this manner it will apparently make one complete revolution about its axis every 24 hours, although the element does not actually rotate, the apparent rotation being due to the rotation of the earth about its own axis. If a map of the earth's surface is drawn on the surface of the sphere and the map and the surface of the earth are correspondingly oriented at some period of the 24 hours, then the exact position of the sphere on the earth will be indicated at this time by the extreme uppermost point of the sphere. This point will of course lie on the vertical diameter of the sphere. In order to determine the position of the sphere at any other time it is necessary to correct this reading for the time elapsed since the sphere and earth were correspondingly oriented. This correction need only be made for longitude since the latitude is correctly indicated at all times. The correct longitude at any time can be determined by correcting the reading taken by 15° per hour for the period elapsed since the longitude was correctly indicated by the uppermost point of the sphere. It is not necessary to draw a chart of the earth on the sphere, but readings can be conveniently taken on a set of meridians drawn through the axis of the sphere which is maintained parallel to the earth's axis and a set of parallels of latitude concentric with this axis.

In carrying out my invention, I employ in one form thereof a hollow sphere, forming a containing vessel, which is mounted in gimbals so as to be maintained in a definite horizontal position irrespective of the position of its support. Inside this sphere is contained a liquid forming a bouyant medium, in which is supported a second sphere, forming the indicating element. The inner sphere has a mean density equal to the density of the liquid in which it is immersed, and is therefore neutrally supported without excess or deficit in bouyancy. The sphere is also balanced about its center. It is therefore in equilibrium in any position in the supporting liquid. The inner sphere is in this manner supported to have all degrees of freedom independently of the position of the outer sphere.

Inside the inner sphere I provide three electric motor driven gyroscopes having their axes approximately at right angles with respect to each other. Each gyroscope is mounted in a frame which is supported on very delicate bearings so as to permit limited precessional movement about an axis which is at right angles with the axis of rotation of the gyroscope. The axes of the three frames of the gyroscopes are also approximately at right angles with respect to each other. Each of the gyroscopes controls the starting, stopping and direction of rotation of a pump motor, which upon precession of the gyroscope forces a stream of the liquid in which the inner sphere is immersed in a direction tangential with the surface of the sphere and so as to counteract the force which caused the precession of the gyroscope.

It will be observed that angular movement of the inner sphere about any axis whatever can be resolved into components about three rectangular axes which are at right angles to both the axes of rotation and the axes of precession of the gyroscopes, respectively. In this manner any angular movement of the inner sphere causes one or more of the gyroscopes to precess through a small angle about the axis of its frame. The direction of the precession determines the direction of rotation of the pump motor controlled by the gyroscope in such a manner as to counteract the force producing the precession. The speed and momentum of the gyroscopes are such that the precessional rotation is large as compared with the rotation of the sphere which produces the precession. In this manner the control of the pump motors is made very sensitive to movements of the sphere.

The control of the pump motors is effected by means of contact arms secured to the frames of the gyroscopes, each of which moves between two stationary contacts in its respective pump motor circuit.

A diameter of the inner sphere which is set parallel with the axis of the earth will thus be maintained parallel with that axis and the sphere stabilized about the axis. By means of a suitable peep hole in the top of the outer sphere readings can be taken of the uppermost point of the inner sphere and the latitude of the instrument immediately determined. By correcting this reading for the time at which the inner sphere occupies a position corresponding with the position of the earth, the longitude of the position of the instrument can be determined.

Figure 2:
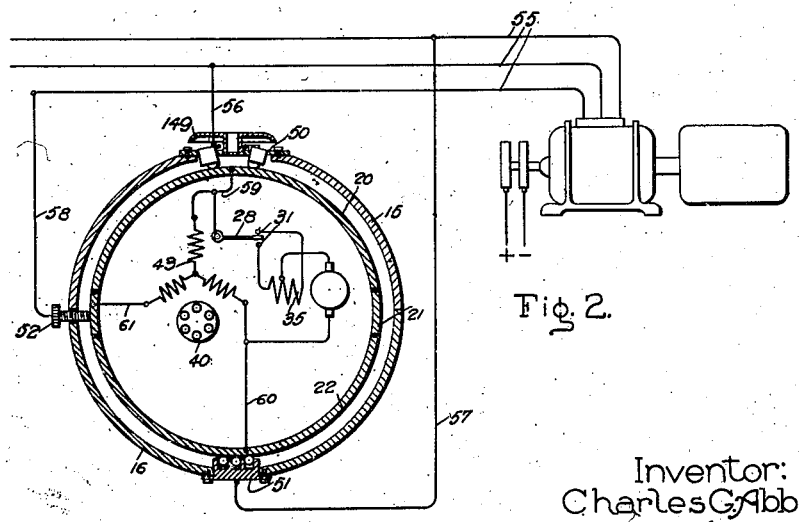
Figure 3:
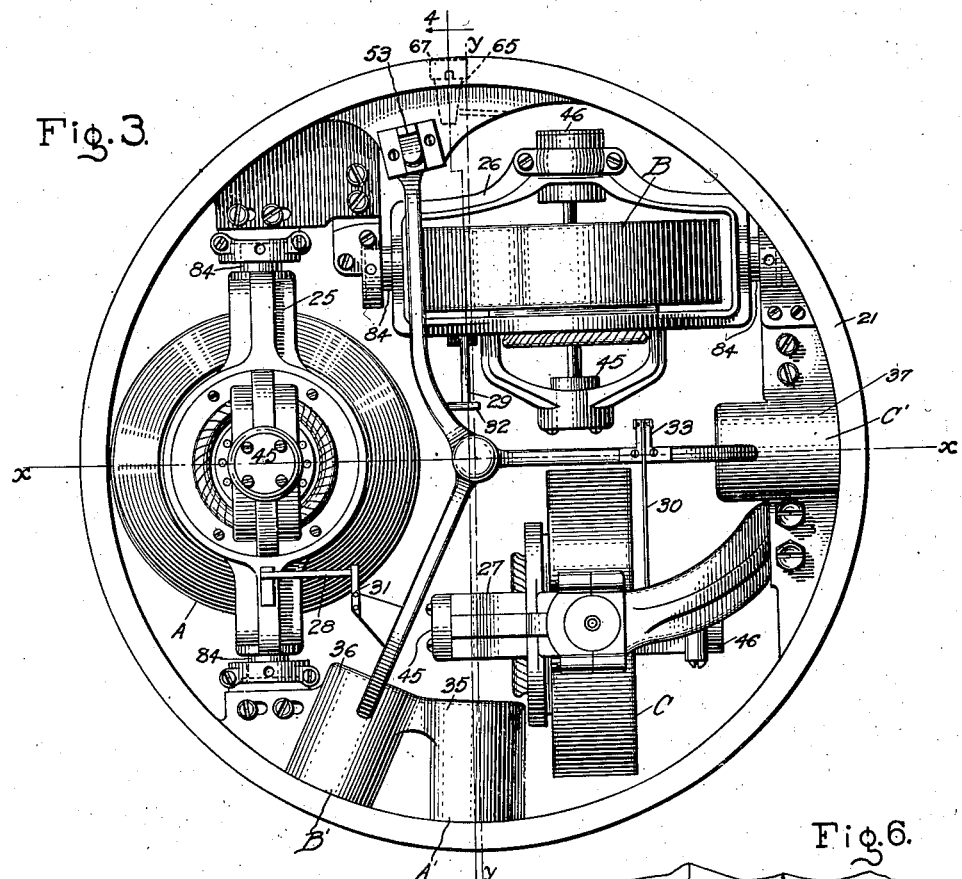
Figure 5:
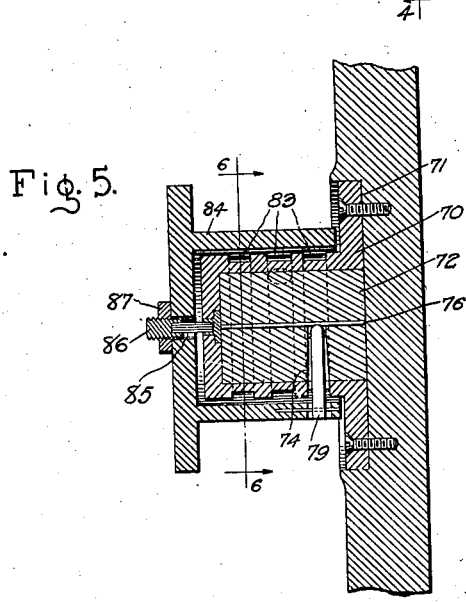
Figure 6:
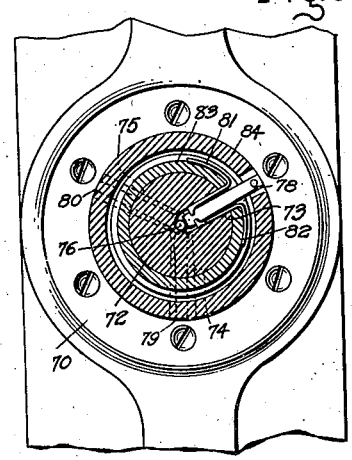
Figure 4:
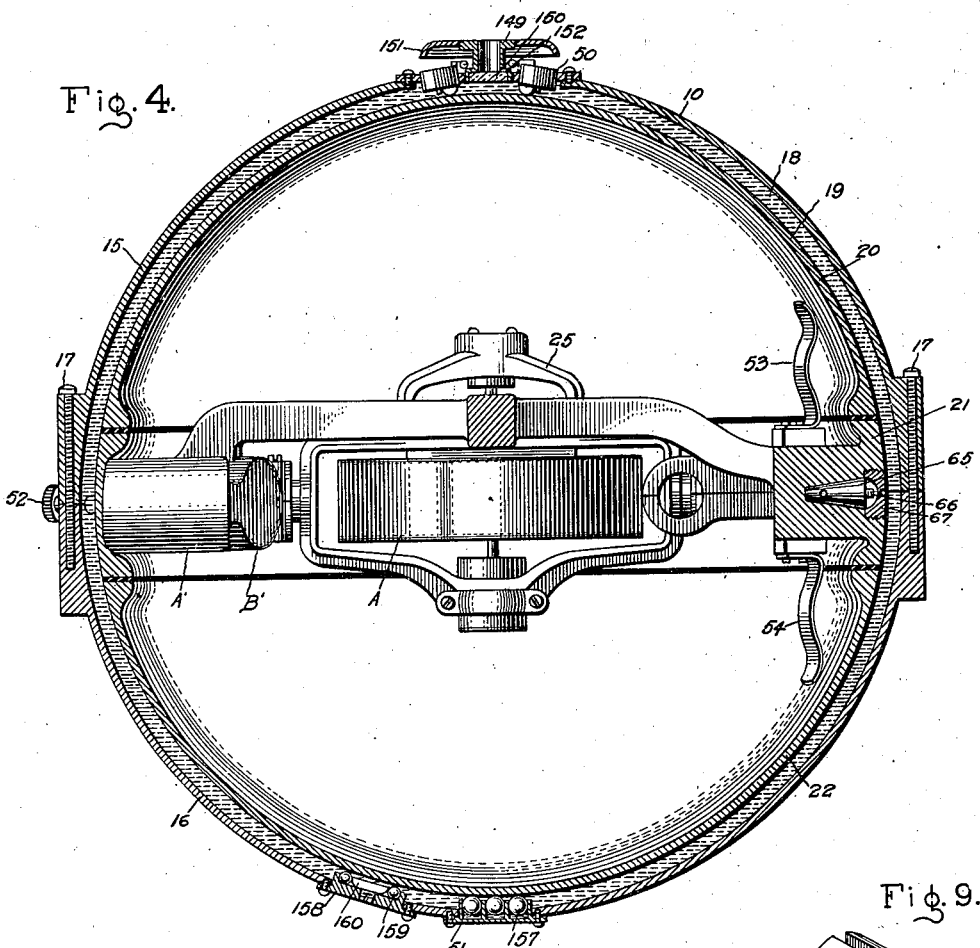
Figure 7:
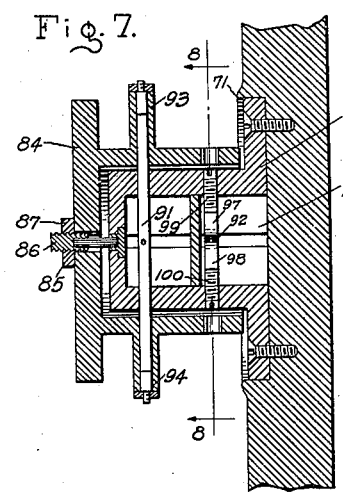
Figure 8:
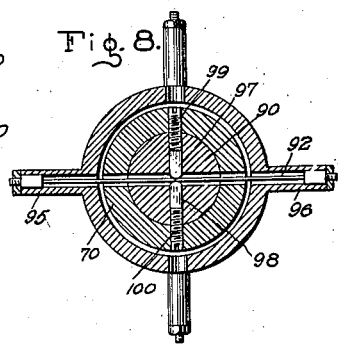
Figure 9:
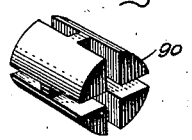
Figure 10:

For a more complete understanding of my invention reference should be had to the accompanying drawings in which Fig. 1 shows a gyroscopically stabilized instrument constructed in accordance with my invention; Fig. 2 shows in diagrammatic form the electrical connections for a single gyroscope motor and a single pump motor; Fig. 3 is a plan view showing the gyroscopic stabilizing apparatus; Fig. 4 is a vertical section through the two spheres along the line 4—4 of Fig. 3 looking in the direction of the arrows; Fig. 5 is an enlarged section view of a bearing for the frames of the gyroscopes; Fig. 6 is a section along the line 6—6 of Fig. 5; Fig. 7 shows a modified form of the bearings shown in Fig. 5; Fig. 8 is a sectional view of Fig. 7 along the line 8—8 looking in the direction of the arrows; Figs. 9 and 10 are views of parts of the bearing shown in Figs. 7 and 8; Fig. 11 is an elevational view of the equatorial zone of the inner sphere showing the outlets of the pump motors; Fig. 12 is an enlarged sectional view of a pump and its driving motor; Fig. 13 is an enlarged view of the pump element driven by the motor; Fig. 14 is an enlarged view of the outlets for the pump; Fig. 15 is a sectional view along the line 15—15 of Fig. 14 looking in the direction of the arrows; Fig. 16 is a sectional view of a gyroscope showing the driving motor therefor; Fig. 17 is an enlarged plan view of the castors for making contact with the upper portion of the inner sphere; Fig. 18 is an enlarged vertical section of one of the castors; Fig. 19 is a sectional view of Fig. 18 along the line 19—19 looking in the direction of the arrows; Fig. 20 is an enlarged view of the arrangement for making contact with the lower portion of the sphere; Fig. 21 shows a modified form of centralizing means for the inner sphere; Fig. 22 is a sectional view of Fig. 21 along the line 22—22 looking in the direction of the arrows; Fig. 23 is a diagrammatic view showing a modified form of making the electrical connection with the inner sphere, while Figs. 24 and 25 show details of the modification shown in Fig. 23.

Referring to Fig. 1 of the drawings, showing one form of my invention, a hollow metallic sphere 10 is supported in a gimbal ring 11, which is mounted on supporting posts 12 and 13 secured to a base 14 by means of which the instrument may be attached to its support. By means of the gimbal support the sphere is always maintained in a definite horizontal position. The instrument is thus particularly adapted for use on airplanes, ships and the like which are continually in motion. The sphere 10 is constructed in two equal halves or hemispheres 15 and 16 which are secured tightly together by means of bolts 17.

Referring to Fig. 4, the sphere 10 is filled with a suitable liquid 18, such as glycerine, in which is immersed an inner hollow metallic sphere 19. The inner sphere is constructed in three sections, an upper section 20, a central or equatorial section 21 and a lower section 22. These sections are insulated from each other and held together by evacuating the sphere. The inner sphere has a mean density equal to the density of the liquid 18 and is balanced about its center. It is therefore in equilibrium in any position in the liquid.

In the equatorial section 21 (Fig. 3) are mounted three gyroscopes A, B and C and three motor-driven pumps A', B' and C' which are controlled, respectively, by the gyroscopes. The rotors of the gyroscopes are mounted in frames 25, 26 and 27, the axes of rotation of the rotors being normally at right angles with each other. The supporting frames for the rotors are mounted on delicate bearings, to be hereinafter described, so as to be movable through small angles about axes which are at right angles, respectively, with the axes of rotation of the gyroscopes and also mutually at right angles with each other. These axes are the axes of precession of the gyroscopes. On the frames of the gyroscopes are secured insulated contact arms 28, 29 and 30, which cooperate, respectively, with pairs of spaced stationary, insulated contacts 31, 32 and 33. Each stationary contact is mounted on the end of a feeble spring arm which yields to continued movement of the contact arm after it engages the contact. The cooperating stationary contacts 31 for arm 28 are in the circuit of an electric motor 35 which operates the pump A'. Contact arms 29 and 30 are arranged to control in a similar manner, through contacts 32 and 33, the circuits for electric motors 36 and 37 which drive pumps B' and C'.

The gyroscopes are similar in construction. They are each driven by a direct connected electric motor. The gyroscope motors are of the alternating current, squirrel cage rotor type. They are adapted to be started on three phase current and operated on single phase. Referring to Fig. 16 the rotor 40 of the driving motor is mounted on the shaft 41 of the gyroscope, while the stator 42 of the motor, having a winding 43, is secured in one arm of the gyroscope frame. The motor extends inside the rim of the gyroscope rotor 44 to provide for greater compactness. The gyroscope is mounted in the frame on bearings 45 and 46, bearing 46 being provided with a double thrust bearing, whereby the weight of the gyroscope is supported in any position.

Connection for the gyroscope motors and pump motors with a source of electric supply is made through the three insulated sections of the inner sphere (Figs. 2 and 4). The connection between the source of supply and the upper section 20 of the inner sphere is made by means of a contact device 50 comprising six spaced castor members, while connection with the lower section 22 of the inner sphere is made by means of contact device 51 comprising a plurality of contact balls floating in mercury cups. The contact devices are secured to the outer sphere and are insulated therefrom. Contact with the equatorial section 21 of the inner sphere is made only temporarily when the gyroscope motors are being started and is effected by means of an insulated screw 52 which extends through the outer sphere and may be turned into engagement with the equatorial section. This screw also serves the purpose of holding the inner sphere in a fixed position while the gyroscopes are being started. Spring contact arms 53 and 54 (Fig. 4), secured inside the inner sphere to the equatorial section in insulated relation therewith, engage the sections 20 and 22. Current is lead from these contact arms to the various gyroscope and pump motors by means of suitable insulated conductors (not shown). During normal operation of the instrument current is supplied for the gyroscope motors and the pump motors by means of contact devices 50 and 51.

In Fig. 2 is shown a typical wiring diagram for a gyroscope motor and a pump motor, for example, for the motor for gyroscope A and for pump motor 35. Connection with a suitable three phase source of variable frequency 55 is made for the contact devices 50 and 51 and contact screw 52 by means of conductors 56, 57 and 58. The circuit from conductor 56 leads through contact device 50 to section 20 of the inner sphere and from this point through a conductor 59 to stator winding 43 and contact arm 28 in parallel. The circuit through two legs of stator winding 43 is completed through conductor 60 and contact device 51 to conductor 57 and through the third leg of the stator winding by way of conductor 61 to screw 52 and conductor 58. After the rotor 40 of the gyroscope motor has been brought up to speed, screw 52 is turned outward to break contact with section 21 and release the inner sphere. The gyroscope motor then runs as a single phase induction motor. The circuit for pump motor 35 is established to conductor 60 by contact arm 28 engaging one or the other of stationary contacts 31.

Two series opposed field windings are provided for motor 35, the energization of one or the other of which is determined by the movement imparted to contact arm 28 upon precession of the gyroscope A. The direction of rotation of the pump motors are in this manner controlled by the direction of the precession of their respective controlling gyroscopes. By providing a variable frequency supply source 55, the gyroscope motors can be started on low frequency, and gradually brought up to full speed by increasing the frequency.

A valve 65 (Fig. 4) is provided in the equatorial section 21 of the inner sphere by means of which the inner sphere, after the three parts 20, 21 and 22 have been assembled, can be evacuated. The valve is provided with a longitudinal opening terminating in a projecting nipple 66 for the attachment of an evacuating pump. A transverse opening in the inner end of the valve intersecting the longitudinal opening is adapted to register with an opening in the valve seat, in the usual manner. After the sphere has been evacuated, the valve is turned to closed position. The sphere is sealed by means of a plug 67 which is seated tightly on the valve, the outer surface of the plug being flush with the surface of the sphere.

Referring to Figs. 5 and 6, the bearings for the supporting frames of the gyroscopes each comprise a cap member 70 which is secured to the supporting frame in a recess 71 forming a seat for it. Fitting tightly inside the cap member 70 and supported thereby is a cylindrical member 72 provided with three transverse radial openings 73, 74 and 75 which are spaced at 120° angles transversely and also at intervals along the length of member 72. Corresponding openings are provided in cap member 70. A small aperture is provided along the central longitudinal axis of member 72 and in this aperture is snugly fitted a small rod 76. The radial openings 73, 74 and 75 are just deep enough to intersect the seat for rod 76. Pins 78, 79 and 80 extend in the openings into engagement with rod 76. The openings are of such size that the pins have a slight freedom of movement therein. By means of flat springs 81 and 82 lying in peripheral grooves 83 in member 70 and extending into the openings, the ends of the pins are biased to central positions therein in the proper relation with rod 76. The pins are pivotally secured at their outer ends to a cap member 84 which loosely encloses member 70. The inner ends of the pins in engagement with rod 76 are rounded, and in a plane transverse to rod 76 are in the shape of arcs described about the pivot points of the pins as centers. Rod 76 is in effect therefore a very small journal secured to the gyroscope frame which bears on relatively large roller bearings provided by the inner ends of the pins. This construction provides very sensitive bearings for the frames of the gyroscopes, by means of which the gyroscopes have great freedom of precession through a limited range for the control of the pump motors. The range of angular movement in the bearing is limited by the freedom which the pins have with respect to member 72. Cap 84 is held against longitudinal movement with respect to member 70 by means of a bundle 85 of small wires extending axially thereof in alinement with rod 76. One end of the bundle is soldered to member 70 and the other end soldered to a short threaded bolt 86 having a nut 87 for adjusting the relation between cap member 84 and member 70. The supporting frames for the gyroscopes are secured to the equatorial section 21 by means of suitable clamps which engage members 84. It will be observed that the component of the weight of the gyroscope along the axis of its frame is supported by the bundles of wire 85. The wires offer but very slight torque in opposition to the small twisting movement to which they are subjected upon movement of the gyroscope about the axis of its frame.

In Figs. 7 to 10, inclusive, is shown a modified form of bearing for the supporting frames of the gyroscopes. Member 70 in this modification is provided with a cylindrical member 90 which fits centrally thereof. Member 90 is provided at each end with two diametrical and longitudinally extending slots which intersect each other at right angles, the slots at the two ends being longitudinally in alinement with each other. Metallic straps 91 and 92 extend at right angles with each other through the slots in member 90 and through alined holes in member 70 into seats 93, 94, 95 and 96 on member 84 in which they are secured. The seats are tubular and project from member 84 a short distance before engaging the ends of the straps, thus increasing the length of the straps. At the center of each strap is a transverse aperture. Small square pins 97 and 98 are inserted in the slots in member 90 through apertures in member 70 into engagement with opposite sides of strap 92 and at right angles therewith. The pins 97 and 98 have their inner ends rounded. Pin 97 is provided with a small projection 97' which extends through the transverse aperture in the strap while pin 98 is provided with a corresponding recess 98' into which the projection 97' fits. Screws 99 and 100 are threaded in the aperture in member 70 and adjusted to hold the pins in engagement with the strap, the rounded inner ends of the pins being held in place by means of their respective projection and recess. Strap 91 is similarly arranged with pins 97 and 98 (not shown). Cap 84 is held against longitudinal movement with respect to member 70 by means of an axial bundle of wires 85 as previously described in connection with Fig. 5. When using this modification of my invention it will be observed that when the gyroscopes are mounted by means of suitable clamps for securing members 84 to the inner sphere, the component of the weight of the gyroscopes in a direction transverse with the axes of the frames is suspended on straps 91 and 92. As will be observed from Fig. 8, when member 70 is turned pins 97 and 98 tend to roll longitudinally of the strap. Movement of member 70 is limited by the freedom which the straps have in the slots in member 90. This arrangement also provides a very sensitive bearing.

Referring to Fig. 11, the pumps A', B' and C' are each provided with a pair of nozzles 101 and 102 which are directed oppositely and in a tangential direction with respect to the surface of the inner sphere. The nozzles of pumps A' and B' are directed in planes respectively at right angles and parallel with the planes of the equatorial section. Pump C' is located 90° in the equatorial plane from pump A' and has its nozzles directed in a plane at right angles with the plane of the equatorial section.

The pumps A', B' and C' are similar in construction and are of the centrifugal type. They each comprise a disc member 103 (Figs. 12 to 15 inclusive) having upon one side a plurality of radial grooves 104 which terminate in a recess 105 at its center. The disc member has a central hub by means of which it is secured to the shaft of the pump motor. It operates in a closely fitting chamber adjacent a plate 106 having a central aperture 107 which leads into the recess 105. The plate 106 also carries the two nozzles 101 and 102, which originate at points diametrically opposite from each other. When the disc member 103 is driven by the electric motor, the liquid 18 is drawn in through opening 107 and forced by centrifugal action along the radial grooves and out through one or the other of the nozzles. The particular nozzle through which the liquid is forced, and hence the direction of the stream, depends upon the direction of rotation of the pump.

The driving motors for the centrifugal pumps are each mounted in a radial recess 108 in the equatorial section (Fig. 12). The stator member 109 carrying the series field coils 110 and 111 fits loosely in a cylindrical casing 112. For convenience in assembling the motor, the stator member is secured to and in spaced relation with a disc 113 of suitable insulating material, such as rubber, by means of a plurality of rods 114. Disc 113 is threaded in the left hand end of the casing, and carries centrally a bearing for the rotor member 115. The opposite end of the rotor shaft is journaled in the right hand end of the casing and has secured on its end the disc member 103 of the centrifugal pump. A packing gland 116 is provided in casing 112 around the right hand end of the rotor shaft. Three terminal pins 117, 118 and 119 for the electric motor are secured in the insulating disc 113. The terminal pins are spaced at 120 degree intervals on the insulating disc and are adapted to co-operate with three similarly spaced insulated connectors 120, 121 and 122 extending through the wall of the equatorial zone into the sphere, the outer ends of the connectors being provided with sockets to receive the terminal pins. The outer end of casing 112 is provided with a flange which is seated on a packing ring 123 to make a tight joint. A recess 124 for pump disc 103 is provided in the outer end of casing 112. This recess is closed by plate 106 forming a chamber for the pump disc. The casing 112 containing the motor and pump together with plate 106 is secured in place in recess 108 by means of a threaded ring 125 which is seated tightly on plate 106. By means of suitable insulated conductors (not shown) leading from connectors 120, 121, and 122, the motor is connected to the supply source through the control device, as indicated diagrammatically in Fig. 2.

Referring to Figs. 17, 18 and 19, the castor contact device 50 comprises a plurality of castor members 130 which are secured to a circular supporting plate 131. Each castor device consists of a metallic cylindrical casing 132, extending longitudinally and centrally of which and secured thereto is a pin 133. The lower end of the pin is pointed and seated in a metallic tubular member 134 which surrounds pin 133 and is provided at its upper end with an enlarged portion forming a seat for ball-bearings 136. Bearings 136 normally engage both pin 133 and the inner wall of casing 132. Member 134 is thus held in a definite relation with casing 132. It is filled with mercury around pin 133 for the purpose of making an electrical connection therewith. Secured to member 134, adjacent its lower end, is a spring 137 which is bent to have two parallel spaced portions 138 and 139. The portions 138 and 139 of the spring carry a shaft 140 upon which is mounted a roller 141. A hollow space 142 filled with mercury is provided in the roller around shaft 140 to make a good electrical connection with the shaft. The periphery of the roller is rounded and provided with a platinum track 143 which normally engages the surface of the inner sphere. The castors are secured to plate 131 so as to fit on the inner sphere and are positioned so that spring 137 on each castor holds its roller against the inner sphere with a very slight pressure. The castor members are particularly designed to make contact with the inner sphere with the least possible impediment to the freedom of movement of the sphere.

The plate 131 (Fig. 17) is provided with a central aperture 145 around which are spaced at 120° intervals three small electric lamps 146, 147 and 148. The lamps are secured to the upper side of the plate. Aperture 145 is threaded to receive an eye piece 149 (Fig. 4) which is provided at its lower end with a glass 150. The eye piece has a circular overhanging portion 151 the lower surface of which forms a reflector for lamps 146, 147 and 148. Apertures 152 are provided in the eye piece adjacent each lamp thru which the light from the lamps is reflected on the surface of the inner sphere. The eye piece is located at the extreme uppermost point of the outer sphere, and due to the gimbal supports for the sphere, it is always in this position. The glass 150 is provided with cross hairs for designating the uppermost point with accuracy.

Referring to Figs. 4 and 20, contact device 51 comprises a plate 155 provided with a plurality of mercury cups 156. The mercury cups are partially filled with mercury on which float contact balls 157. The balls are preferably made light in weight so that they are easily supported by the mercury. They may be constructed, for example, of carbon covered with a layer of electrically conducting material, such as copper. Plate 155 is adjusted in such manner that the balls are held lightly in contact with the surface of the inner sphere by the buoyant effect of the mercury.

Under normal conditions of operation the inner sphere is supported by the buoyant effect of the liquid contained in the outer sphere and engages only the contact devices 50 and 51 although these devices do not support any of its weight. In order to overcome any tendency of the inner sphere to move out of its proper central position for any appreciable distance, four roller bearing devices 158 (Figs. 1 and 4) are provided on the outer sphere. These devices consist of a plate having a plurality of ball-bearings 159 confined in a circular race way which is formed by a flange on the plate and a member 160 secured centrally of the flange.

In Figs. 21 and 22 is shown a modified form of spacing member 158. This form comprises a castor 162 secured to a plate. On the castor are two rollers, 163 and 164, of which 164 is slightly the larger. Roller 164 lies in a plane containing the axis of its support and normally is engaged by the inner sphere when the sphere moves out of its central position. Should the inner sphere move to a considerable extent from its central position, however, it will engage roller 163. The rollers are biased to a vertical position by means for a counterbalancing weight 165.

In Figs. 23, 24 and 25, I have shown a modified form of the apparatus for conveying current to the various sections of the inner sphere, in which the contact devices 50 and 51 each are replaced by a metallic electrode 166. The electrodes extend thru the wall of the outer sphere and are insulated therefrom. The inner end of the electrode is enlarged in the shape of a disc 167 and slightly concave to conform with the shape of the inner sphere. The inner sphere floats between the two electrodes in close proximity to them but without touching them. Current is conducted from the electrodes to the sphere thru the thin layer of liquid 18 which in this modification has a conductivity suitable to carry the current for the motor, but sufficient resistance not to short-circuit the electrodes. Any suitable liquid, such as brine, may be used.

The electrodes are preferably arranged diametrically opposite, but slight distances from the upper and lower extremities of the outer sphere to provide for the attachment of eye piece 149.

The surface of the inner sphere is provided with a map of the earth's surface or with meridians and parallels of latitude by means of which points on the earth's surface can be designated. A definite diameter of the inner sphere, forming an axis, is chosen with reference to which the map or meridians and parallels of latitude are drawn. This diameter is preferably the diameter at right angles to the equatorial section 21. It forms an axis which is held parallel with the earth's axis and about which the inner sphere is stabilized.

As thus constructed and arranged the operation of my invention is as follows: When it is desired to start the gyroscopes the inner sphere is adjusted in the following manner until its axis is parallel with the earth's axis. Assuming that the latitude as indicated by the cross hairs is incorrect for the location of the instrument, the inner sphere is first adjusted to give the correct latitude reading. To accomplish this, the inner sphere is clamped by screw 52 and the two spheres rotated together in the gimbals about an axis at right angles to the observed meridian line in a direction and by an amount which is thought sufficient to bring up the proper latitude circle. Screw 52 is then turned out and the outer sphere released whereupon it assumes a horizontal position. The inner sphere, however, remains in its adjusted position. This operation may be repeated if necessary until the proper latitude circle is indicated by the cross hairs when the outer sphere is in a horizontal position. If it is now found that screw 52 falls off the equatorial section, the instrument is rotated about a vertical axis independently of the inner sphere to bring screw 52 in position to engage the equatorial section of the inner sphere, after which the inner sphere is clamped by the screw, and the instrument rotated as a whole about the vertical axis, to adjust the previously chosen axis of the inner sphere in azimuth parallel with the earth's axis. This adjustment may be made by turning the instrument until the observed meridian on the inner sphere lies in a true north and south position, which may be determined with reference to a compass maintaining the true north and south, such as a gyro-compass.

The supply source is now connected to the two contact devices and to the screw, after reducing its frequency to a low value. This energizes the three gyroscope motors, causing them to start as three-phase induction motors. The frequency is gradually increased to bring the motors up to speed. During the starting of the gyroscopes, the orientation of the inner sphere is held fixed by clamping screw 52 no matter whether or not the pump motors remain inactive. When the gyroscopes have been brought up to speed, screw 52 is turned out to break contact with and also release the inner sphere. The gyroscope motors now operate as single phase induction motors. The inner sphere will now be controlled under the influence of the gyroscopes so as to be held closely in the original position in which the gyroscopes were started, the axis of the inner sphere being maintained parallel with the earth's axis. As the earth rotates about its axis its movement is resolved into a component of movement of the outer sphere about the axis of the inner sphere. This movement of the outer sphere by exercising a drag through the liquid or any other movement due to unstability of the support is resolved about one or more of three axes at right angles with each other, each of which is at right angles to both the axis of rotation and the axis of the frame of a gyroscope. The resulting movements of the gyroscopes about these three axes, respectively, causes them to precess and control the pumps to counteract the force causing the precession.

Upon movement of the inner sphere about an axis X—X in the equatorial plane, gyroscope A precesses about the axis of its frame 25 in one direction or the other, moving contact arm 28 into engagement with one of the pairs of contacts 31 thus causing pump motor A' to operate and throw liquid in a plane at right angles to the equatorial plane and in a direction to set up a reactive force on the sphere tending to move it about axis X—X back to its original position. This causes the gyroscope to precess in the opposite direction, moving contact arm 28 back toward mid-position of the contacts 31. When the sphere reaches its original position about axis X—X, the pump motor circuit is broken to stop the pump by contact arm 28 disengaging its stationary contact. Movement of the inner sphere about its axis which was set parallel with the earth's axis causes precession of gyroscope B about the axis of its frame, which precession moves contact arm 29 into engagement with one of the pair of contacts 32, thus controlling pump B' to throw liquid in the equatorial plane in a direction to oppose the force causing the precession, the pump motor circuit being broken by the contact arm when the sphere reaches its original position about this axis. In like manner, movement of the inner sphere about axis y—y in the equatorial plane causes precession of gyroscope C about the axis of its frame so as to control pump C' through contact arm 30 and one of contacts 33 to throw liquid in a plane at right angles to the equatorial plane and in a direction to oppose the force causing the precession. Each stationary contact, being mounted on a feeble spring arm, yields in case the movement of the contact arm is continued by further precession of the gyroscope after the contact is engaged and offers but slight opposition to such movement. This, together with the delicate bearings for the frames, prevents the possibility of inaccuracies due to restraint of precession.

It is contemplated that the pumps will be so designed that they will more than counteract the forces causing precession of the gyroscopes, whereby the pumps will be continually reversed and the inner sphere maintained constantly in a state of vibration. Although the precessional movement of the gyroscopes is actually very slight, it is relatively large in comparison with the movement causing the precession, and consequently the control of the pumps is made very sensitive to movement of the inner sphere.

Observations are taken through the eyepiece to determine the position of the instrument on the earth's surface, which position is indicated by the cross hairs with reference to the surface of the inner sphere. This observation always gives the latitude correctly. To determine the longitude it is necessary to correct the reading by an amount equal to 15 degrees per hour for the period elapsed since the base time when the inner sphere and the earth were correspondingly oriented. This base time is found by observating the time at which the cross hairs indicate the correct longitude. Since the inner sphere apparently moves toward the west due to the effect of the earth's rotation, this correction must be subtracted from the observed longitude when the instrument has been moved toward the east, and the observed longitude subtracted from the correction when the instrument has been moved toward the west.

In the following claims I use the expression "neutrally supported" and define it to mean, when the supporting medium is a liquid, a condition of buoyancy just sufficient without excess or deficit to produce the support in question.

In accordance with the provisions of the patent statutes, I have described the principle of operation of my invention, together with the apparatus which I now consider to represent the best embodiment thereof, but I desire to have it understood that the apparatus shown is only illustrative, and that the invention can be carried out by other means.

What I claim as new and desire to secure by Letters Patent of the United States, is,—

1. A gyroscopic navigation instrument comprising a buoyant medium, an element neutrally supported therein, a plurality of gyroscopes in said element arranged so that rotation of the element in any direction causes precession of one or more of said gyroscopes, and means controlled by said precession for producing a force acting on said element in opposition to the force causing the precession.

2. A gyroscopic navigation instrument comprising a vessel, a liquid contained in said vessel, an element supported in said liquid, a gyroscope carried by said element and means controlled by the precession of said gyroscope for acting on said liquid so as to set up a reactive force on said element in opposition to the force causing the precession.

3. A gyroscopic navigation instrument comprising a vessel, a liquid contained in said vessel, an element supported in said liquid so as to have all degrees of freedom therein, a plurality of gyroscopes in said element arranged so that any force tending to rotate the element causes precession of one or more of said gyroscopes, and means controlled in response to said precession for acting on said liquid so as to set up a reactive force on said element in opposition to the force causing the precession.

4. A gyroscopic navigation instrument comprising a vessel mounted so as to be maintained in a definite horizontal position, a liquid contained in said vessel, a sphere supported in said liquid so as to have all degrees of freedom therein, gyroscopically controlled means for maintaining said sphere in a definite angular position in space unaffected by the earth's rotation, whereby the position of the instrument on the earth's surface is designated by the uppermost point of said sphere on its vertical diameter with reference to the time at which the earth and the sphere are similarly oriented, and sighting means carried by said vessel for observing said point.

5. A gyroscopic navigation instrument comprising a vessel, a liquid contained in said vessel, an element neutrally supported in said liquid so as to have all degrees of freedom therein, gyroscopic stablizing means in said element, and means controlled by said stablizing means for acting on said liquid so as to maintain said element in a definite angular position in space unaffected by the earth's rotation.

6. A gyroscopic navigation instrument comprising a vessel, a liquid contained in said vessel, an element neutrally supported in said liquid so as to have all degrees of freedom therein, gyroscopic stablizing means carried by said element, and pumps controlled by said stablizing means for throwing streams of said liquid reacting so as to maintain said element in a definite angular position in space unaffected by the earth's rotation 7. A gyroscopic navigation instrument comprising a vessel, a liquid contained in said vessel, an element neutrally supported in said liquid so as to have all degrees of freedom therein, three gyroscopes in said element having their axes of rotation mutually at right angles with each other and mounted to precess about axes respectively at right angles with said axes of rotation and mutually at right angles with each other, and pumps in said element controlled by precession of said gyroscopes to throw tangential streams of said liquid reacting on said element in opposition to the force causing the precession, whereby said element is maintained in a definite angular position in space unaffected by the earth's rotation.

8. A gyroscopic navigation instrument comprising a vessel, a liquid contained in said vessel, a hollow sphere neutrally supported in said liquid so as to have all degrees of freedom therein, three gyroscopes in said sphere having their axes of rotation mutually at right angles with each other and being free to precess about axes respectively at right angles with said axes of rotation and mutually at right angles with each other, pumps in said sphere for throwing tangential streams of said liquid, electric motors for driving said pumps, and control means for said motors responsive to precessional movement of said gyroscopes so as to cause said pumps to throw streams of said liquid reacting on said element in opposition to the force causing the precession, whereby said sphere is maintained in a definite angular position in space unaffected by the earth's rotation.

9. A gyroscopic navigational instrument comprising a vessel, a liquid contained in said vessel, a hollow sphere neutrally supported in said liquid, said sphere being formed in a plurality of insulated sections secured together by evacuating the sphere, a gyroscope mounted in said sphere, an electric motor for driving said gyroscope having its terminals connected to the sections of said sphere, and contact means in engagement with said sections for connecting said motor to a source of electric supply.

10. A gyroscopic navigational instrument comprising a vessel, a liquid contained in said vessel, a hollow sphere neutrally supported in said liquid, said sphere being formed in a plurality of insulated sections secured together by evacuating the sphere, gyroscopic stabilizing means contained in said sphere, pumps carried by said sphere, electric driving motors for said pumps controlled by said stabilizing means so as to cause said pumps to throw streams of said liquid to maintain said sphere in a definite angular position in space unaffected by the earth's rotation, and contact means in engagement with said sections for connecting said motors to a source of electric supply.

11. In a gyroscopic navigation instrument, a support, a gyroscope, a movable frame in which said gyroscope is mounted, cylindrical members secured to the frame having central longitudinal apertures lying in the axis of precession of the gyroscope and circumferentially and longitudinally spaced radial openings leading into said longitudinal apertures, rods supported in said longitudinal apertures, pins extending loosely in said radial openings into engagement with said rods having their outer ends pivoted on said support and their inner ends shaped in the form of arcs described about their pivots as centers, whereby precession of the gyroscope causes rolling movement of said rods on said pins limited by the freedom of said pins in said radial openings, and resilient means for biasing said pins centrally in said radial openings.

12. In a gyroscopic navigation instrument, a support, a gyroscope, a movable frame in which said gyroscope is mounted, bearings on said support for said frame in the axis of precession of the gyroscope, and a plurality of wires secured to said support and said frame in said axis for holding said frame against movement along said axis while allowing rotation thereof on said bearings.

13. In a gyroscopic navigation instrument, a support, a gyroscope, a movable frame in which said gyroscope is mounted, journals for said frame lying in the axis of precession of the gyroscope, radially extending pins pivoted to said support upon which said journals roll during precession of the gyroscope, and a plurality of wires attached to said support and said frame in said axis of precession for holding said frame against movement along said axis.

14. A navigation instrument comprising a vessel, an electrically conducting liquid contained in said vessel, a hollow sphere supported in said liquid so as to have all degrees of freedom therein and having a plurality of insulated sections, stabilizing means in said sphere, an electric motor for driving said stabilizing means having its terminals connected to the sections of said sphere, a source of electrical supply for said motor, and a plurality of electrodes in said liquid connected to said supply source for conveying current for said motor through said liquid to the sections of said sphere.

15. A gyroscopic navigation instrument comprising a vessel, an electrically conducting liquid contained in said vessel, a hollow sphere neutrally supported in said liquid so as to have all degrees of freedom therein and having a plurality of insulated sections, a gyroscope in said sphere, an electric motor for driving said gyroscope having its terminals connected to the sections of said sphere, a source of alternating current supply for said motor, and a plurality of electrodes secured to said vessel and connected to said supply source for conveying current for said motor through said liquid to the sections of said sphere.

In witness whereof, I have hereunto set my hand this twenty-second day of October, 1921.

CHARLES G. ABBOT.